(12) United States Patent
Ishikawa (10) Patent No.: US 8,711,450 B2
(45) Date of Patent: Apr. 29, 2014

(54) IMAGE READING APPARATUS, IMAGE READING METHOD AND PROGRAM

(75) Inventor: Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 13/380,710

(22) PCT Filed: Jul. 14, 2011

(86) PCT No.: PCT/JP2011/066640
§ 371 (c)(1),
(2), (4) Date: Dec. 23, 2011

(87) PCT Pub. No.: WO2012/017835
PCT Pub. Date: Feb. 9, 2012

(65) Prior Publication Data
US 2012/0105926 A1   May 3, 2012

(30) Foreign Application Priority Data

Aug. 6, 2010   (JP) ................. 2010-178075

(51) Int. Cl.
*H04N 1/46* (2006.01)
*H04N 1/04* (2006.01)
*H04N 1/60* (2006.01)
*G06K 15/00* (2006.01)
*G06K 9/00* (2006.01)

(52) U.S. Cl.
USPC ........... 358/505; 358/509; 358/475; 358/474; 358/1.9; 358/3.06; 382/112

(58) Field of Classification Search
USPC ................. 358/505, 509, 475, 474, 1.9, 3.06; 382/112
See application file for complete search history.

(56) References Cited

U.S. PATENT DOCUMENTS

| | | | |
|---|---|---|---|
| 5,047,854 A | 9/1991 | Iwabuchi et al. | |
| 5,892,595 A | 4/1999 | Yamakawa et al. | |
| 7,327,492 B2 | 2/2008 | Yokochi | |
| 7,773,776 B2 * | 8/2010 | Adachi | 382/112 |
| 2004/0169895 A1 * | 9/2004 | Hashizume et al. | 358/474 |
| 2005/0083543 A1 * | 4/2005 | Suzuki et al. | 358/1.9 |
| 2006/0152765 A1 * | 7/2006 | Adachi | 358/3.06 |

(Continued)

FOREIGN PATENT DOCUMENTS

| | | |
|---|---|---|
| JP | 04-011458 A | 1/1992 |
| JP | 08-139949 A | 5/1996 |

(Continued)

*Primary Examiner* — Charlotte M Baker
*Assistant Examiner* — Rury Grisham
(74) *Attorney, Agent, or Firm* — Fitzpatrick, Cella, Harper & Scinto (57) ABSTRACT

An image reading apparatus, an image reading method and a program are provided for favorably correcting color misalignment in a sub-scanning direction of a read signal read by a plurality of line sensors without increasing a circuit scale or processing time. To accomplish this, the image reading apparatus sets, as a reference signal, the read signal that is output from one of the plurality of line sensors, and detects a correlation between the reference signal and each of a plurality of read signals output from line sensors other than the one of the plurality of line sensors of a plurality of lines that are displaced in predetermined line units from a line from which the reference signal is read, and selects a read signal having a high correlation with the reference signal as a read signal from the line of the reference signal.

10 Claims, 10 Drawing Sheets

(56) References Cited

U.S. PATENT DOCUMENTS

| | | | |
|---|---|---|---|
| 2009/0097078 A1* | 4/2009 | Ide et al. | 358/474 |
| 2011/0096375 A1* | 4/2011 | Mikami | 358/475 |
| 2011/0317938 A1 | 12/2011 | Takasaka et al. | |
| 2012/0008180 A1* | 1/2012 | Ishido | 358/509 |

FOREIGN PATENT DOCUMENTS

| | | |
|---|---|---|
| JP | 09-266536 A | 10/1997 |
| JP | 2000-224375 A | 8/2000 |
| JP | 2002-142122 A | 5/2002 |
| JP | 2003-259135 A | 9/2003 |

* cited by examiner

IMAGE READING APPARATUS, IMAGE READING METHOD AND PROGRAM

TECHNICAL FIELD

The present invention relates to an image reading apparatus, an image reading method and a program for correcting color misalignment that has occurred in color image data.

BACKGROUND ART

An image scanner that reads an original document as electronic image data includes a line sensor such as a CCD (Charge Coupled Device) or CIS (Contact Image Sensor), in which a plurality of light-receiving elements are linearly arrayed. The image scanner reads the original document image while moving the line sensor in a direction (sub-scanning direction) orthogonal to the array direction (main scanning direction) of the light-receiving elements. Alternately, there is an image scanner configured such that the line sensor is fixed and the original document is moved and the original document image is read.

However, there is a problem in that when an original document image is read by moving the line sensor or the original document, color misalignment occurs due to an effect from mechanical vibration that occurs in a driving mechanism for moving the line sensor or the original document in the sub-scanning direction, or feed accuracy. An example of the reading method is a line sequential reading method in which light sources of at least three colors, such as R (red), G (green) and B (blue), for example, are sequentially caused to emit light while the line sensor is moved, thereby reading the original document image with the colored light of these light sources. In the line-sequential reading method, generally, the line sensor or an original document to be read is continuously moved during the reading operation, and thus the read positions of the R, G, and B light at the emission timing shift in the sub-scanning direction as described above, causing color misalignment to occur when an original document including characters, line images or the like is read.

Even in a case where the sensors covering the main scanning direction separately for the colors R (red), G (green) and B (blue) are disposed so as to be displaced from each other in the sub-scanning direction such that the colors are read simultaneously, color misalignment occurs due to fluctuation in moving speed in the sub-scanning direction. This is because, with respect to image data read at a certain point in time, the positions of the sensors are different for each color, and thus it is necessary to correct the positions of the sensors in the sub-scanning direction according to the moving speed and the spacing between the sensors in the sub-scanning direction. However, the estimated read position and the actual read position are displaced from each other due to fluctuation in the moving speed in the sub-scanning direction, and as a result, color misalignment occurs.

Various image reading methods are proposed in order to correct or reduce color misalignment. A method for correcting color misalignment is known in which image data for each read line is replaced by the weighted average of the image data of the read line and the image data of the read line of the same color immediately preceding or subsequent thereto. In Japanese Patent Laid-Open No. 2000-224375, a technique is proposed where the emission order of the R, G and B light is controlled in order to further improve the positional accuracy of R, G and B in the lines after averaging. Also, in Japanese Patent Laid-Open No. 2002-142122, a technique is proposed where an original document is read at double resolution in the sub-scanning direction, and after calculating the weighted average with the lines immediately preceding or subsequent thereto, the resultant image data is thinned.

As another image reading method, for example, in Japanese Patent Laid-Open No. 04-11458, a technique is proposed where the image information read for each emission color is converted to luminance information and color-difference information, and spatial frequency band restriction is applied to only the color-difference information such that color misalignment is reduced while maintaining the perceived resolution. Also, in Japanese Patent Laid-Open No. 2003-259135, a technique is proposed in which after the image information is converted to luminance information and saturation information, a pixel having the lowest luminance in the vicinity of a target pixel is set as a determination pixel, and if the target pixel is determined to be an achromatic color based on the saturation information in the vicinity of the determination pixel, the data of the target pixel is replaced to the achromatic color.

However, the conventional techniques have problems described below. For example, with the image reading method disclosed in Japanese Patent Laid-Open No. 2000-224375, not only the pixels affected by color misalignment but the resolution of the image, which is a fundamental performance criterion, deteriorates, which is not preferable. Also, although the degree of color misalignment is reduced as a result of the weighted average processing, it is not completely eliminated. Also, with the image reading method disclosed in Japanese Patent Laid-Open No. 2002-142122, although deterioration of the resolution can be avoided, since the reading resolution is doubled, the size of the pixel data to be processed is doubled. Therefore, if the operation speed of the color misalignment correction circuit is the same, double the reading time is required. Of course, the method can be realized without extending the reading time by increasing the operation speed of the color misalignment correction circuit two fold, but the apparatus cost will increase if a circuit configuration that supports such high-speed operation is realized, which is not preferable.

Also, with the image reading method disclosed in Japanese Patent Laid-Open No. 04-11458, although the effect on the perceived resolution, reading time and cost is small, the color misalignment is only reduced to some extent due to the spatial frequency band restriction, and is not completely eliminated. Furthermore, with the image reading method disclosed in Japanese Patent Laid-Open No. 2003-259135, although the method has a sufficient effect for black characters, no processing is performed with respect to the color misalignment in the contour portions of colored characters, the color misalignment in black characters on a chromatic color background, or the like.

SUMMARY OF INVENTION

The present invention enables realization of an image reading apparatus, an image reading method and a program for favorably correcting color misalignment in the sub-scanning direction of read signals read by a plurality of line sensors, without increasing the circuit scale or processing time.

One aspect of the present invention provides an image reading apparatus comprising: a plurality of line sensors that are disposed in mutually different positions in a conveyance direction of an original document, and that respectively read the original document in line units and respectively output a read signal of a different color; a correlation detecting means for setting, as a reference signal, the read signal that is output from one of the plurality of line sensors, and detecting a correlation between the reference signal and each of a plurality of read signals output from other line sensors in a plurality of lines that are displaced in predetermined line units from a line from which the reference signal is read, such that positional displacement in a sub-scanning direction between the line sensors is corrected and line positions of read signals of each color are aligned; and a selecting means for selecting a read signal having a high correlation with the reference signal as a read signal from the line of the reference signal, based on a result of the detection performed by the correlation detecting means.

Another aspect of the present invention provides an image reading method of an image reading apparatus that comprises a plurality of line sensors that are disposed in mutually different positions in a conveyance direction of an original document, and that respectively read the original document in line units and respectively output a read signal of a different color, the method comprising: a correlation detecting means setting, as a reference signal, the read signal that is output from one of the plurality of line sensors, and detecting a correlation between the reference signal and each of a plurality of read signals output from other line sensors in a plurality of lines that are displaced in predetermined line units from a line from which the reference signal is read, such that positional displacement in a sub-scanning direction between the line sensors is corrected and line positions of read signals of each color are aligned; and a selecting means selecting a read signal having a high correlation with the reference signal as a read signal from the line of the reference signal, based on a result of the detection performed in the setting and detecting performed by the correlation detecting means.

Still another aspect of the present invention provides a computer-readable storage medium storing a computer program for causing a computer to execute the image reading method.

Further features of the present invention will be apparent from the following description of exemplary embodiments with reference to the attached drawings.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Reading Apparatus

A first embodiment of the present invention will be described below with reference to FIGS. 1 to 5C. First, the main structure of the image reading unit in an image reading apparatus 200 will be described with reference to FIG. 2. An original document 201 to be read is conveyed by original document conveyance rollers 202, passes over an original document discharge member 203, and is discharged outside the image reading apparatus 200. Color image sensors 204 including an R sensor 204a, a G sensor 204b and a B sensor 204c are disposed between the original document conveyance rollers 202 and the original document discharge member 203, the R sensor 204a, the G sensor 204b and the B sensor 204c being disposed in different positions in the conveyance direction of the original document. Each sensor reads the corresponding color component amount of a conveyed original document 201 for each line, and outputs read signals. The present embodiment is described by using a fixed color line sensor as an example. The line sensors read an original document that passes over the line sensors. However, the present invention is not limited to this, and can also be applied to the system in which a fixed original document is read by a movable line sensor.

Here, the positional relation of the color image sensors with respect to the original document 201 is described with reference to FIG. 3. The sub-scanning direction of the color image sensors 204 is opposite to the original document conveyance direction shown in FIG. 2, and is from the leading edge to the trailing edge of the original document 201. As clearly understood from FIG. 3, at a certain point in time, the R sensor 204a, the G sensor 204b and the B sensor 204c each read the original document 201 at different positions in the sub-scanning direction. For this reason, it is necessary to correct the positional displacement in the sub-scanning direction between the line sensors. Generally, the color misalignment in the sub-scanning direction due to the positional difference between the sensors is corrected by using buffers for the delay amount according to the positional difference between the sensors and the original document conveying speed in the sub-scanning direction.

Figure 2:
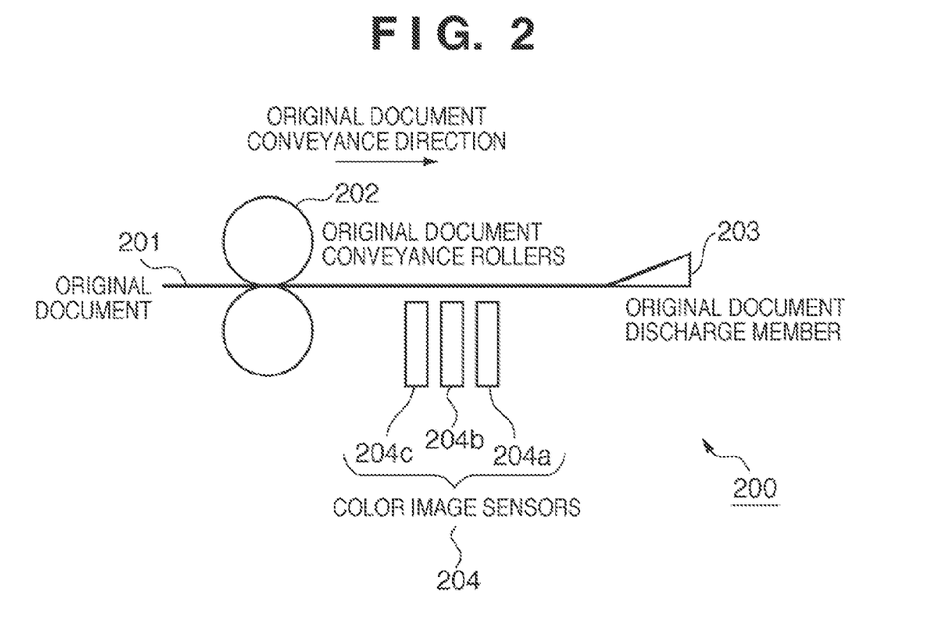
FIG. 2 is a cross-sectional view illustrating an example configuration of a reading control unit in an image reading apparatus according to the first embodiment.
Figure 3:
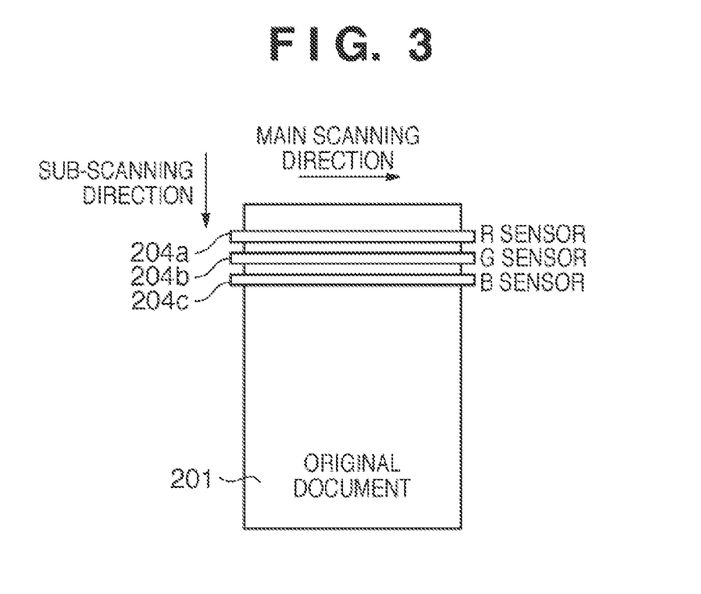
FIG. 3 is a plan view illustrating the positional relation of color image sensors with respect to an original document according to the first embodiment.

However, as shown in FIG. 2, when the leading edge of the original document 201 reaches the original document discharge member 203, the original document conveying speed may be reduced due to the impact of the collision. Also, when the trailing edge of the original document 201 is separating from the original document conveyance rollers 202, the original document conveying speed may be increased because the original document is pushed out due to the pressure caused by the original document conveyance rollers 202 (the force sandwiching the original document). Conventionally, since the delay amount of the buffers used for positional alignment in the sub-scanning direction between the line sensors is fixed, when the original document conveying speed changes from a normal speed as described above, the positional alignment in the sub-scanning direction is not achieved and color misalignment occurs.

In view of this, in the present embodiment, out of the image data for three colors that is read by the color image sensors 204 in FIG. 2, the G sensor 204b positioned in the middle of the sensors is used as a reference, the positions in the sub-scanning direction of R image data and B image data are corrected according to the correlation of the image data of the R sensor 204a and the B sensor 204c at the different positions in the sub-scanning direction with respect to the image data of the G sensor 204b. Of course, the present invention can also be implemented by using another sensor as the reference sensor.

Reading Control Unit

Figure 1:
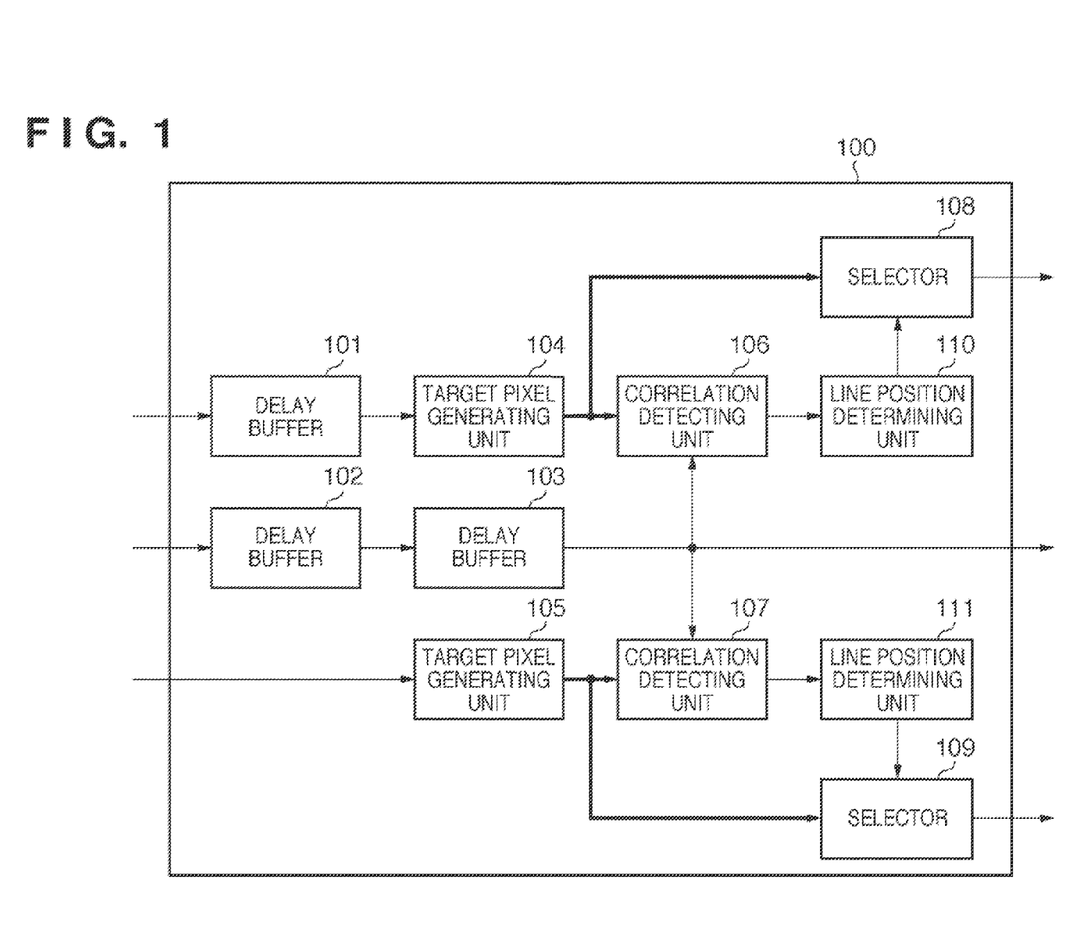
FIG. 1 is a block diagram illustrating an example of a color misalignment correction apparatus according to a first embodiment.

Next, an example configuration of a reading control unit 100 that corrects color misalignment in the sub-scanning direction in the image reading apparatus 200 will be described with reference to FIG. 1. The reading control unit 100 includes delay buffers 101, 102 and 103, target pixel generating units 104 and 105, correlation detecting units 106 and 107, selectors 108 and 109, and line position determining units 110 and 111.

The delay buffers 101 and 102 align the positions in the sub-scanning direction of the R image data and the B image data, respectively. The target pixel generating units 104 and 105 each generate a target signal for detecting the positional displacement in the sub-scanning direction of the corresponding image data with respect to the reference signal (G image data). The delay buffer 103 compensates delay due to the target pixel generating units 104 and 105. The correlation detecting units 106 and 107 each detect the correlation with the G image data serving as a reference signal. The line position determining units 110 and 111 each determine the target signal in a position (line) that has a high correlation with the reference signal (G image data), and decides the line position to be selected. The selectors 108 and 109 each select the data of the line position corresponding to the determination made by the line position determining units 110 and 111.

Target Pixel Generating Unit

Next, a detailed example configuration of the target pixel generating unit 104 will be described with reference to FIG. 4. Note that since the target pixel generating unit 105 has the same configuration, the description thereof is omitted. Line delay buffers 401 to 405 each delay input image data (read signal) by one line, thereby generating target signals. Interpolation units 406 to 410 each generate target signals by displacing the image data input thereto by 0.5 line (a predetermined line unit). Here, the target signal refers to a signal including one line of target pixels.

Here, description is provided assuming that a maximum relative displacement amount of each target signal with respect to the reference signal is ±2 lines, and the correction accuracy is 0.5 line. In this case, five line delay buffers, 401 to 405, and five interpolation units, 406 to 410, are necessary in order to also cover the compensation for the delay that occurs when selection is made by the selector 108. Note that in the case where the relative displacement amount is different, the number of line delay buffers 401 to 405 may be reduced or increased, and in the case where the correction accuracy is changed, the interpolation units 406 to 410 corresponding to the accuracy after change may be used. Also, with respect to a method for generating target signals in the interpolation units 406 to 410 by displacing the image data input thereto by a displacement amount less than one line, a known method such as linear interpolation or bicubic interpolation can be applied, and thus the method is not described here.

Correlation Detecting Unit and Line Position Determining Unit

Figure 5A:
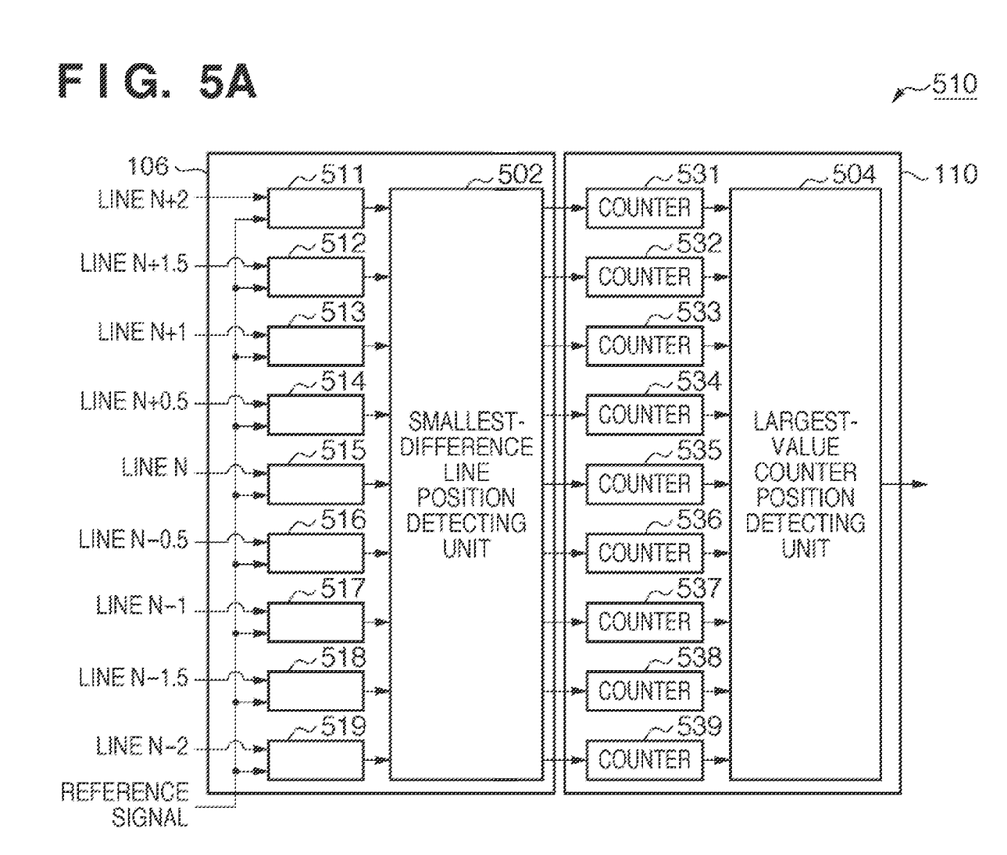
FIGS. 5A and 5B are a block diagram illustrating a detailed example configuration of a correlation detecting unit 106 and a line position determining unit 110 according to the first embodiment.
Figure 5B:
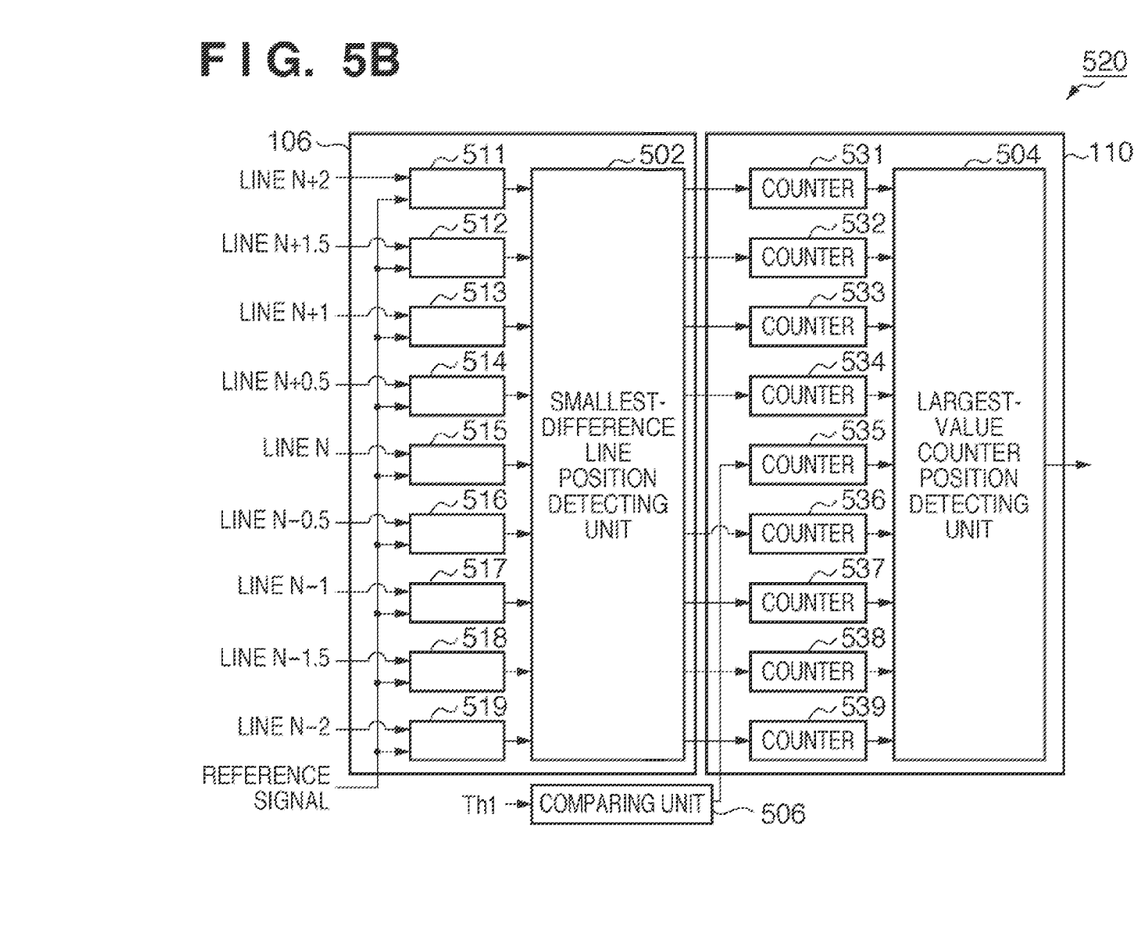
Figure 5C:
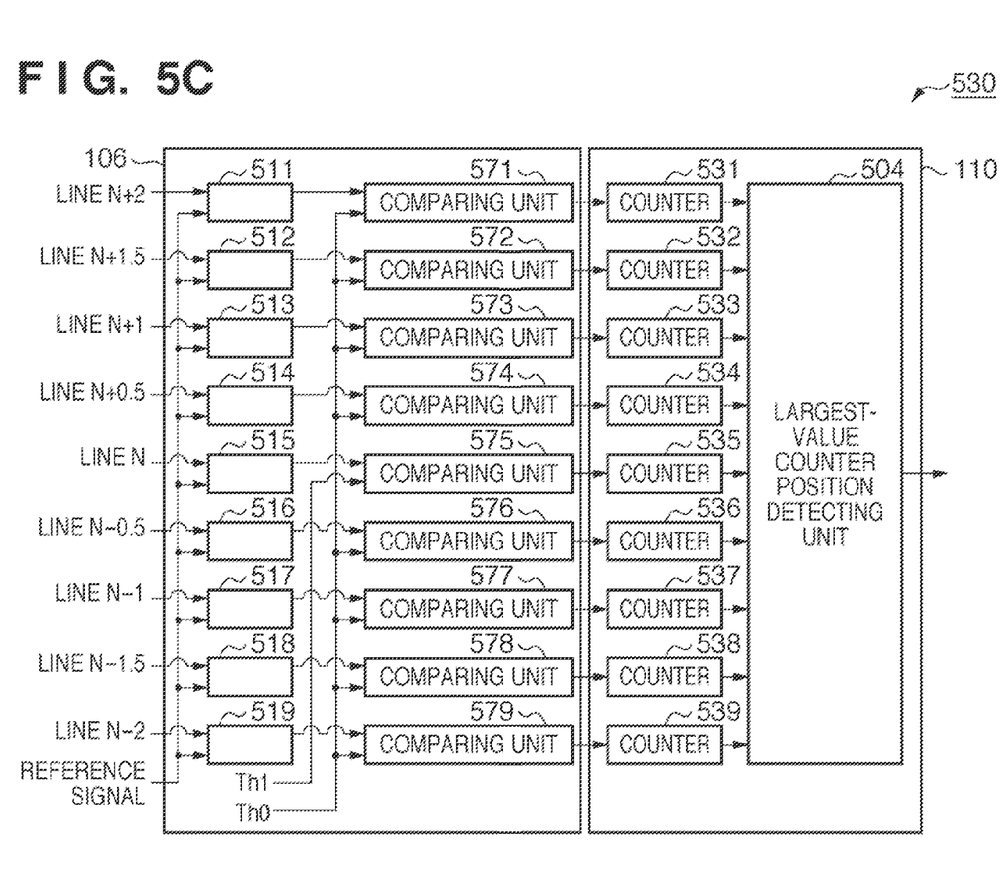
FIGS. 5C and 5D are a block diagram illustrating a detailed example configuration of the correlation detecting unit 106 and the line position determining unit 110 according to the first embodiment.

Next, detailed example configurations of the correlation detecting unit 106 and the line position determining unit 110 will be described with reference to FIGS. 5A to 5C. First, an example configuration of reference numeral 510 shown in FIGS. 5A and 5B will be described. The correlation detecting unit 106 includes absolute difference generating units (calculation means) 511 to 519 and a smallest-difference line position detecting unit (specifying means) 502, and detects the correlation between the reference signal and the target signal of each line. On the other hand, the line position determining unit 110 includes counters 531 to 539 and a largest-value counter position detecting unit 504, and determines the target signal of the line having a high correlation based on results of the detection performed by the correlation detecting unit 106.

The absolute difference generating units 511 to 519 each generate an absolute difference between the reference signal (G image data) and the target signal for each of the plurality of pixels included in one line. The smallest-difference line position detecting unit 502 detects the line position where the absolute value of the difference between the reference signal (G image data) and the target signal is the smallest. In the case where there are two or more lines having the same absolute difference, the line closest to the original position (the line closest to the line N in the center, in FIG. 5A) is selected. Also, in the case where such two or more line positions are at the same distance from the original position, the line whose distance to the previous line is closer to one line in distance is selected. Here, the previous line refers to the line selected for the immediately previous reference signal.

The smallest-difference line position detecting unit 502 outputs, for each pixel, an enable signal to one of the counters 531 to 539 corresponding to the line position detected as the smallest-value line position, and increments the count value of that counter by 1. The counters 531 to 539 are cleared at the first pixel of each line, and the counter corresponding to the line position having the highest correlation with the reference signal is incremented for each pixel. The largest-value counter position detecting unit 504 refers to the counters 531 to 539 at the end of one line of image data, determines the line position corresponding to the largest count value, controls the selector 108 and selects the image data in that line position (target signal) as the line corresponding to the reference signal.

Figure 4:
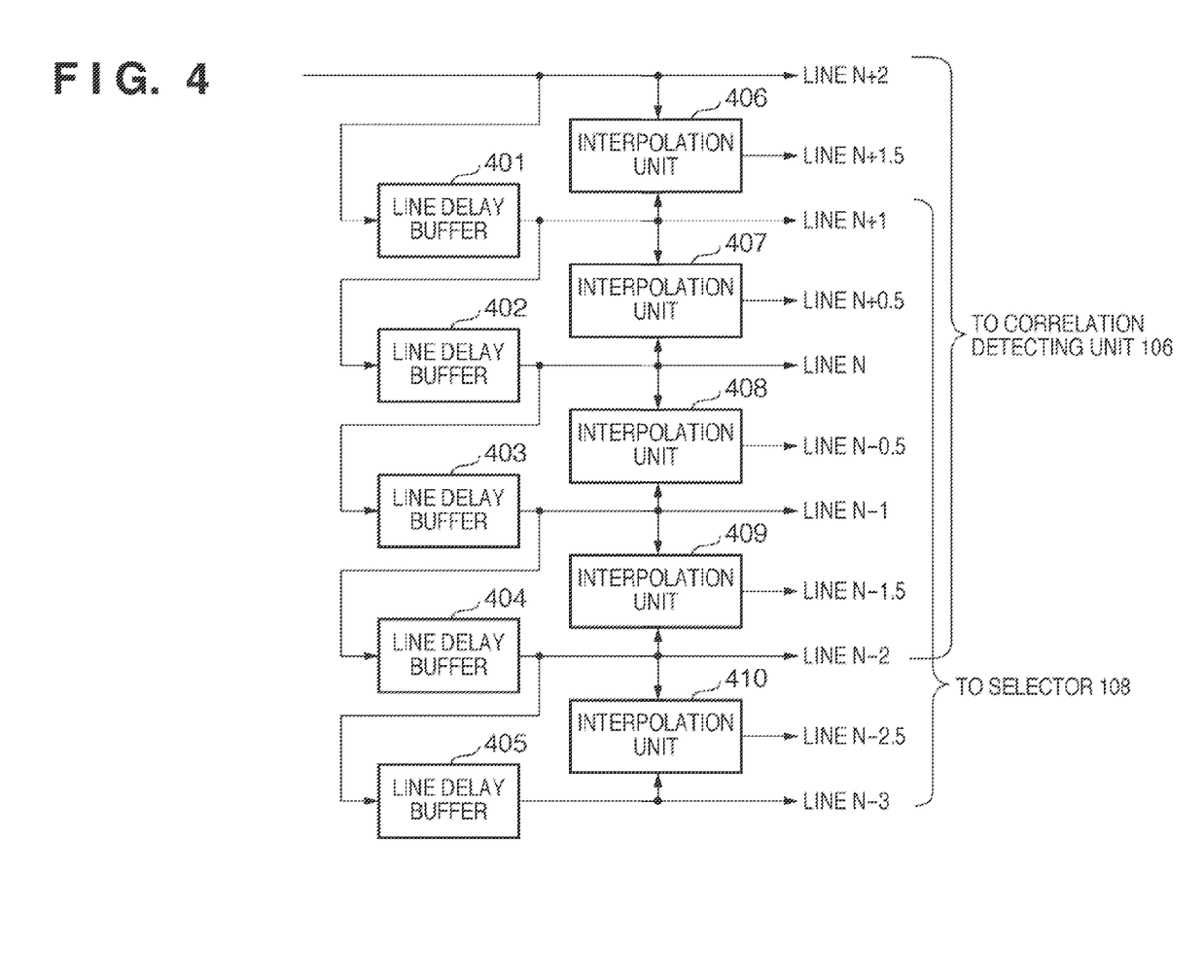
FIG. 4 is a block diagram illustrating a detailed example configuration of a target pixel generating unit 104 according to the first embodiment.

In this manner, since time corresponding to one line is required for detecting correlation, the signal input to the selector 108 is delayed by one line from the signal input to the correlation detecting unit 106, as shown in FIG. 4. Also, the control signal of the selector 108 is controlled for each line. Note that although the value of one of the counters 531 to 539 is incremented in the description provided above, in the case where there are a plurality of line positions having the smallest difference, the values of the counters corresponding to all these line positions may be incremented. That is, it is sufficient if the line having the highest correlation with the reference signal (G image data) can be selected. Note that in the case where two or more counters have the same value, the line that is the closest to the original position (the line closest to the line N in the center, in FIG. 5A) is selected. Also, in the case where the lines corresponding to two or more such counters are at the same distance from the original position, the line whose distance to the previous line is closer to one line in distance is selected.

Next, as a modification, an example configuration of reference numeral 520 shown in FIG. 5B will be described. Note that only portions different from the configuration of 510 will be described below. In the configuration of 520, a comparing unit 506 is added to the configuration of 510, and if the absolute difference of the original line is less than or equal to a threshold Th1, the counter 535 corresponding to the original line position is incremented. Here, the original line refers to the line corresponding to the line from which the reference signal is read, and corresponds to the line N in this example. Accordingly, the smallest-difference line position detecting unit 502 specifies the line having the smallest absolute difference out of a plurality of absolute differences of the lines other than the original line without referring to the absolute difference of the original line position, and outputs the enable signal.

That is, since a difference less than the threshold Th1 is likely to be noise, in the case where the absolute difference of the original line is less than or equal to the threshold, the counter 535 corresponding to the original line position is also incremented, thereby preventing erroneous operations caused by the noise. Note that the processing subsequent to the counters 531 to 539 is the same as the configuration of 510, and thus is not described here.

Next, as a modification, an example configuration of reference numeral 530 shown in FIG. 5C will be described. Note that in the description provided below, only portions different from the configuration of 510 will be described. In the configuration of 530, in addition to the configuration of 501, comparing units 571 to 579 are added to the correlation detecting unit 106, and if the absolute difference from the reference signal at a certain line position is less than or equal to the corresponding threshold Th0 or Th1, the counter out of the counters 531 to 539 corresponding to the line position is incremented. Accordingly, the smallest-difference line position detecting unit 502 is not necessary. That is, a line position having an absolute difference less than or equal to the threshold Th0 or Th1 is considered to have a high correlation, and the counter out of the counters 531 to 539 corresponding to the line position is incremented. After that, when counting is finished for one line, the largest-value counter position detecting unit 504 determines that the line position whose counter value is the largest is the line having the highest correlation, and selects the line by using the selector 108. In this example, in order to prioritize the original line position (position that is not corrected) as in the configuration of 520, the threshold for the comparing unit 575 corresponding to the original line is set to a value different from the threshold Th1 (Th1≥Th0), but thresholds Th1 and Th0 may have the same value. Note that the processing subsequent to the counters 531 to 539 is the same as the configuration of 510, and thus is not described here.

Figure 5D:
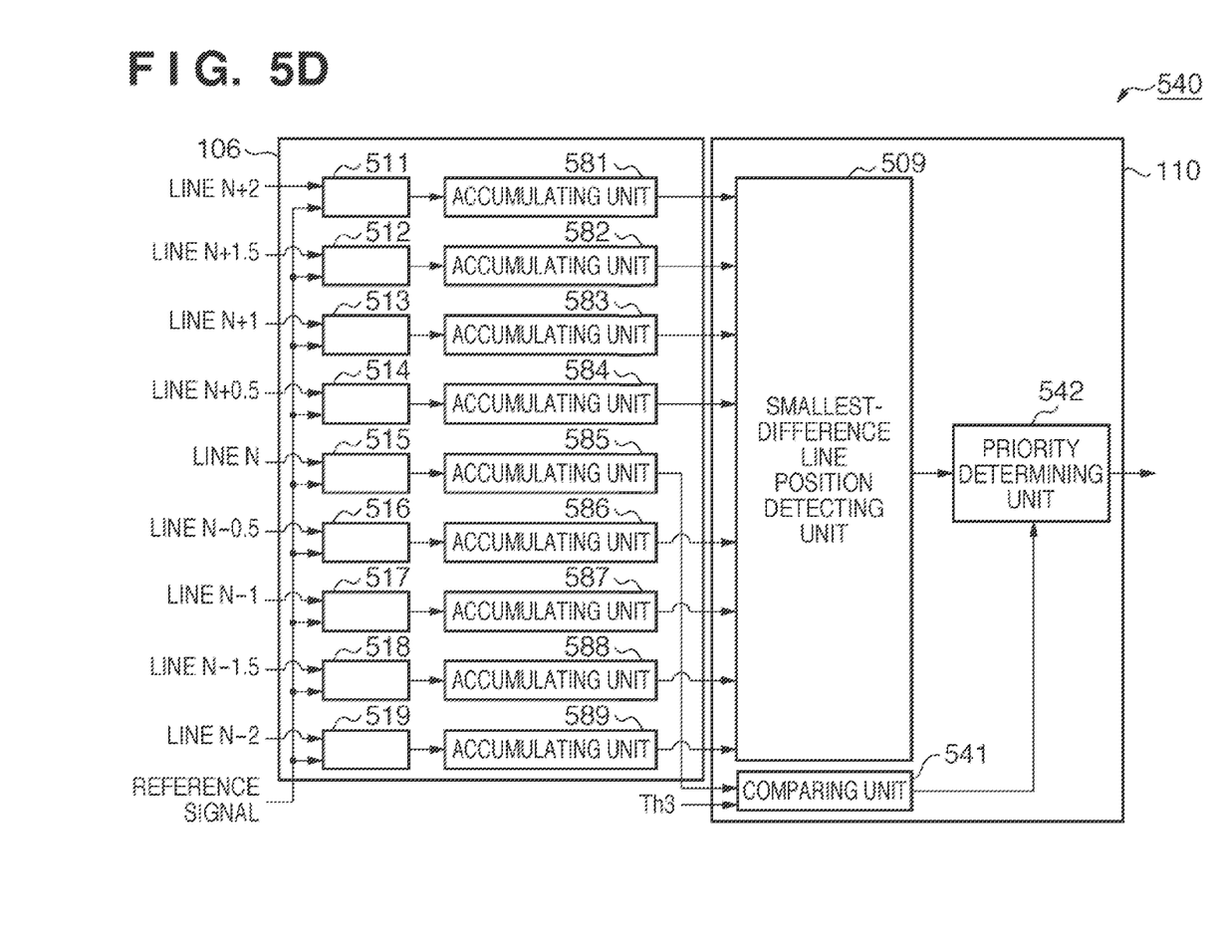

Next, as a modification, an example configuration of reference numeral 540 shown in FIG. 5D will be described. Note that in the description provided below, only portions different from the configuration of 510 will be described. In the configuration of 540, accumulating units 581 to 589 are added to the correlation detecting unit 106, a smallest-difference line position detecting unit 509 is added to the line position determining unit 110, the line position whose accumulation value of the absolute difference from the reference signal is the smallest is determined to be the line having the highest correlation, and the selector 108 is controlled. In this example, in order to prioritize the original line position (position that is not corrected) as in the configuration of 520, the accumulation value of the original line position is compared with a threshold Th3 in a comparing unit 541, and if the accumulation value is less than or equal to the threshold, a priority determining unit 542 controls the selector 108 so as to select the original line position. Note that in the case where the above-described priority determination is not necessary, the accumulation value of the original line position can be input to the smallest-difference line position detecting unit 509 to cause the smallest-difference line position detecting unit 509 to make the determination, similar to the other lines. In this case, the comparing unit 541 and the priority determining unit 542 are not necessary. The configuration of 540 can also be applied to the configuration of 530.

Figure 5E:
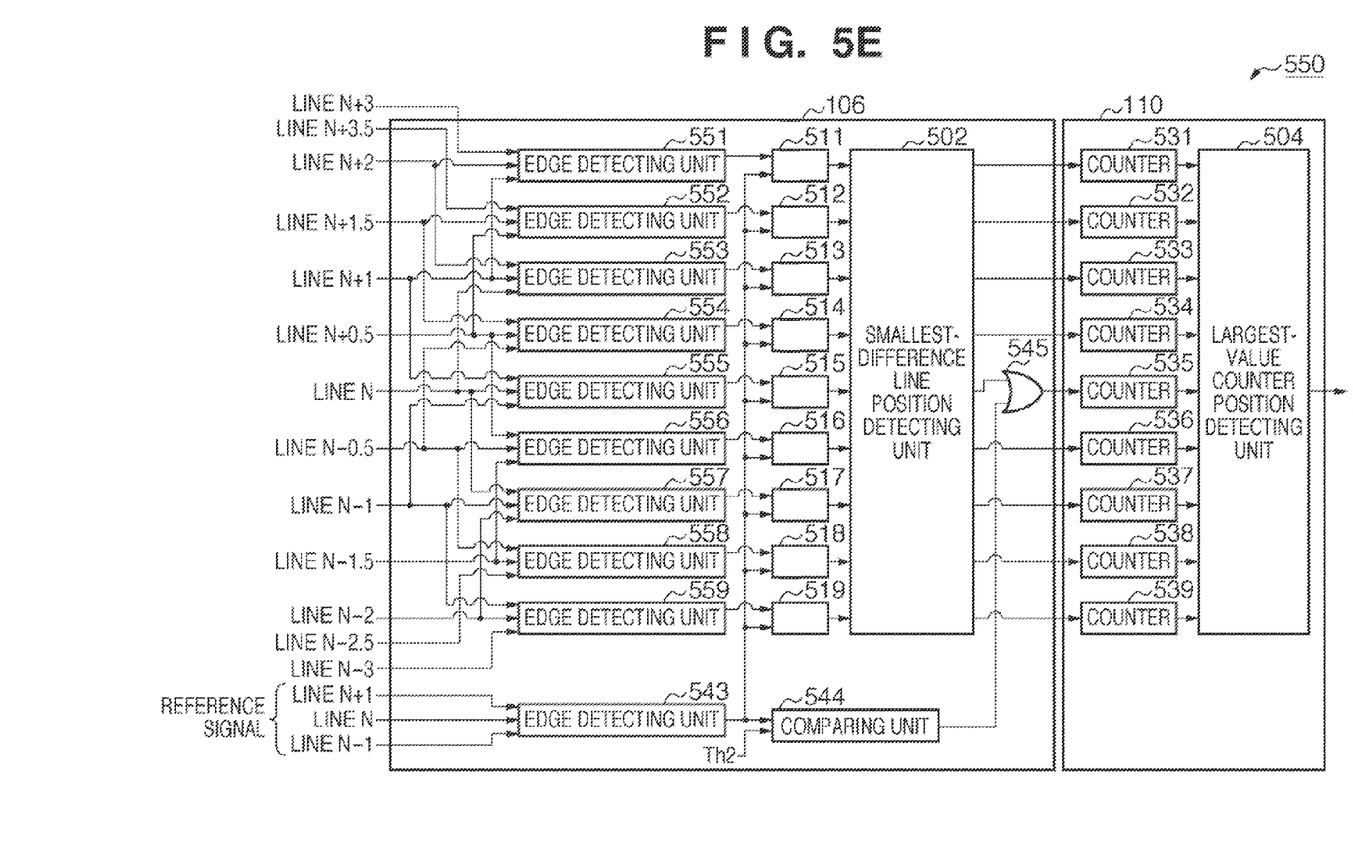
FIG. 5E is a block diagram illustrating a detailed example configuration of the correlation detecting unit 106 and the line position determining unit 110 according to the first embodiment.

Next, as a modified example, an example configuration of reference numeral 550 shown in FIG. 5E will be described. Note that in the description provided below, only portions different from the configuration of 510 will be described. However, the configuration of 550 can also be applied to the configurations of the above-described 520, 530 and 540. In the configuration of 550, edge detecting units 543, 551 to 559, a comparing unit 544 and an OR circuit 545 are added to the correlation detecting unit 106, and correlation is detected based on the difference of the edge amount. That is, the color misalignment occurs in an edge portion, and if the positions of the edge portions are aligned, the color misalignment is resolved.

The edge detecting units 551 to 559 each output, as an edge amount, the sum of the absolute differences with pixels in the lines above and below the target line position. The edge detecting unit 543 outputs, as an edge amount, the sum of the absolute differences with pixels in the lines above and below the reference signal. Therefore, the absolute difference generating units 511 to 519 each generate the absolute differences between the edge amount of the input target signal and the edge amount of the reference signal. The processing subsequent to the absolute difference generating units 511 to 519 is the same as the configuration of 510. Note that if it is determined in the comparing unit 544 that the edge amount of the reference signal is less than or equal to a threshold Th2, it is determined that the reference signal corresponds to a flat portion, and the counter 535 for the original line position is incremented in the OR circuit 545. Note that in the case where the above-described priority determination is not necessary, the comparing unit 544 and the OR circuit 545 may be removed.

As described above, with the present embodiment, by selecting output image data having little color misalignment out of a plurality of candidates having different displacement amounts in the sub-scanning direction, favorable color misalignment correction results can be obtained with a circuit having a comparatively small size, or a comparatively short software processing time.

Second Embodiment

Figure 6:
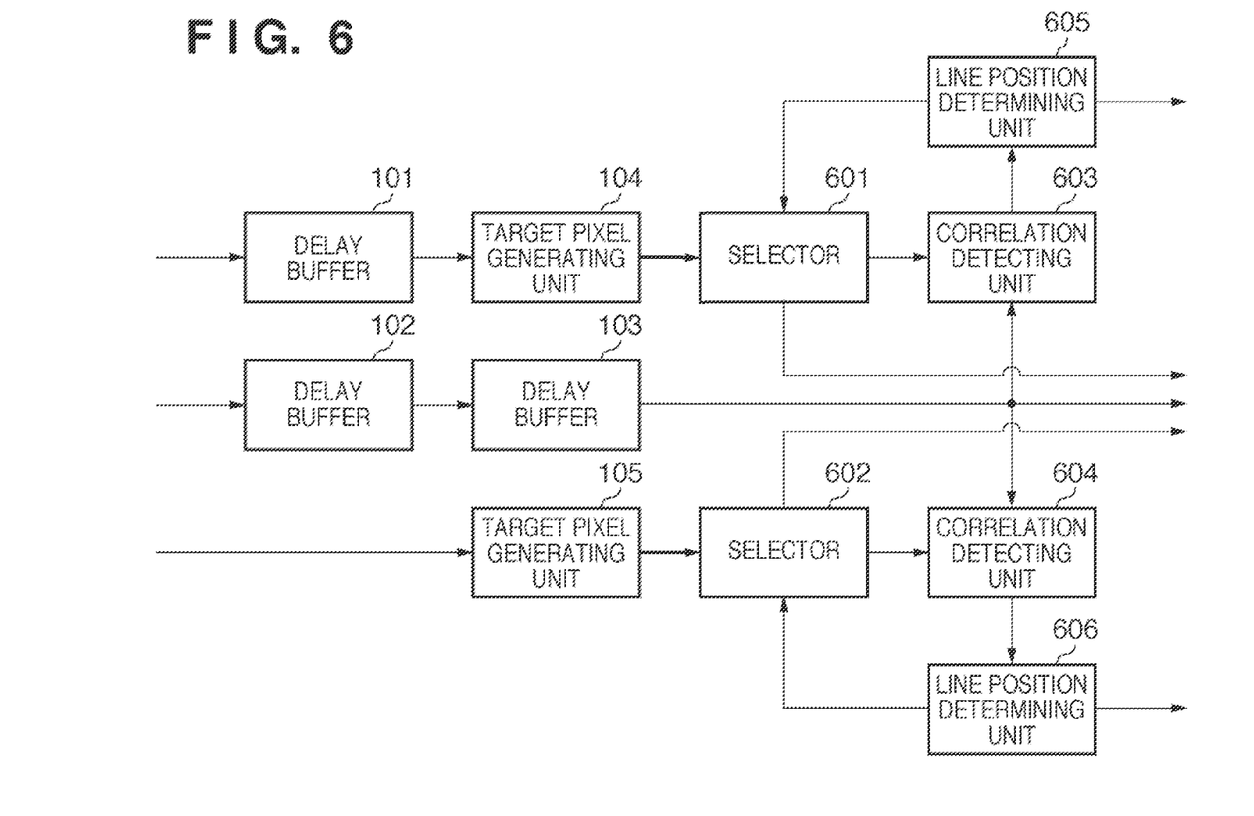
FIG. 6 is a block diagram illustrating an example of a color misalignment correction apparatus according to a second embodiment.
Figure 7:
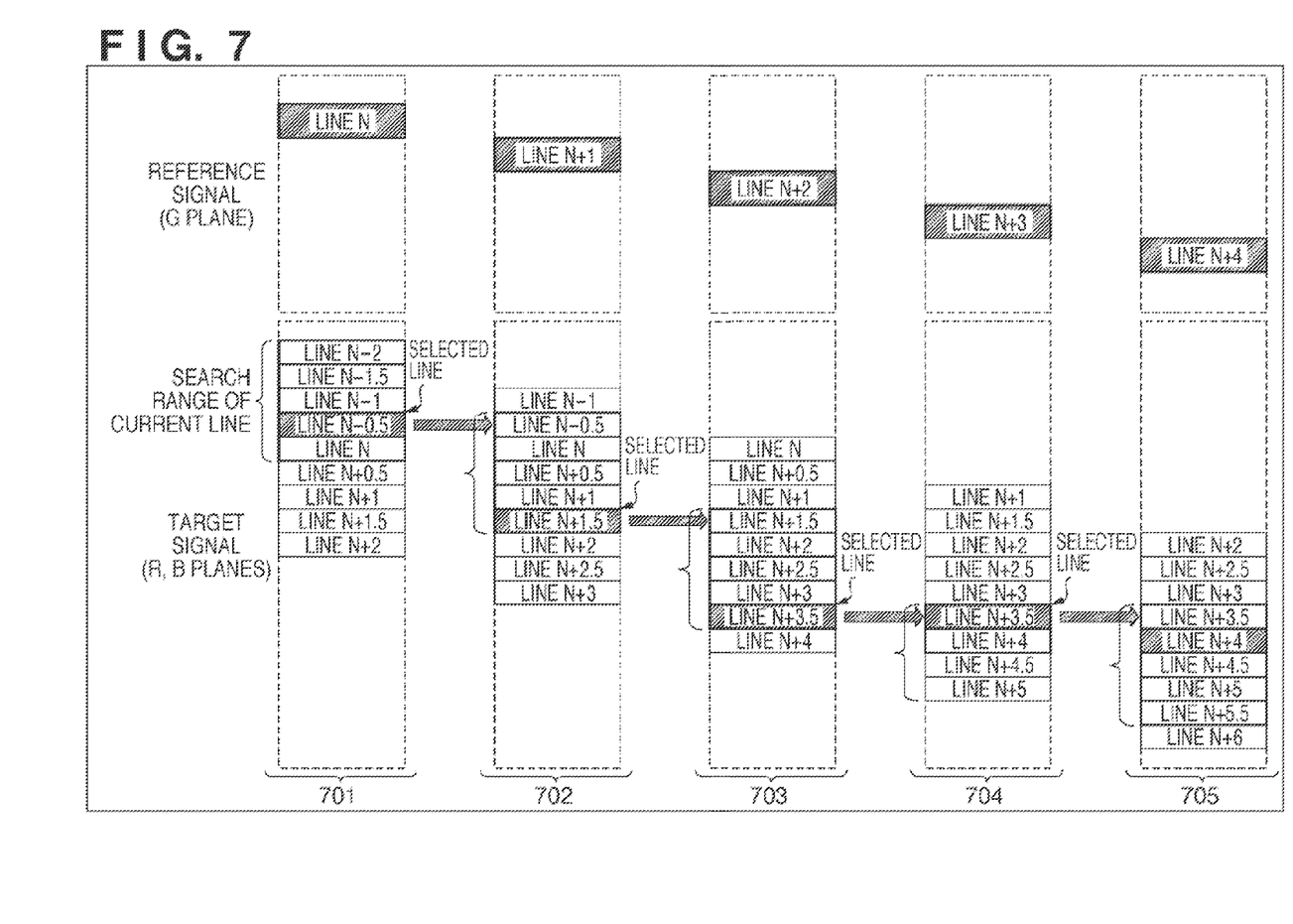
FIG. 7 is a diagram illustrating a target line range according to the second embodiment.

Next, a second embodiment of the present invention will be described with reference to FIGS. 6 and 7. Note that in the description provided below, only portions different from the first embodiment will be described. Elements that are the same as those in the configuration of the first embodiment are given the same reference numerals. Firstly, an example of a color misalignment correction apparatus of the present embodiment will be described with reference to FIG. 6.

A large difference between the second embodiment and the first embodiment is the position of selectors 601 and 602. The selectors 601 and 602 each output, out of the target lines of the target pixel generating units 104 and 105, respectively, a two-line range starting from the line selected for the previous line. That is, the selectors 601 and 602 each function as a narrowing means for narrowing down the inputs from the target pixel generating units 104 and 105, respectively, and chooses the line to be employed as the target signal. Correlation detecting units 603 and 604 each detect the correlation between the G image data serving as the reference signal and the target signal that has been chosen. Line position determining units 605 and 606 each determine the target signal corresponding to the position (line) having a high correlation with the reference signal (G image data), and decides the line position to be selected. In the present embodiment, by setting the target range to a range starting from the line selected for the previous line, it is possible to avoid selecting positions whose order is reversed, and also to reduce the target range. In this manner, the selectors 601 and 602, the correlation detecting units 603 and 604, and the line position determining units 605 and 606 can be simplified.

Next, shifting of the target line range output from the selectors 601 and 602 will be described with reference to FIG. 7. Here, the reference signal (G image data) shifts from the line N to the line N+4 as the state progresses from reference numeral 701 to reference numeral 705. At this time, the target line range is from the line N−2 to the line N in the state 701, and it is assumed that the line N−0.5 has been determined to have a high correlation and selected as the output line.

The target range of the following line is from the line N−0.5 to the line N+1.5, as shown in the state 702. Then, it is assumed that the line N+1.5 has been determined to have a high correlation and selected as the output line. Then, the target range of the following line is from the line N+1.5 to the line N+3.5, as shown in the state 703. Then, it is assumed that the line N+3.5 has been determined to have a high correlation and selected as the output line. Although the target range of the following line is from the line N+3.5 to the line N+5.5, the line N+5.5 exceeds the range that is set to two lines starting from the reference signal, and thus the target range is from the line N+3.5 to the line N+5, as shown in the state 704. Then, if it is assumed that the line N+3.5 has been determined to have a high correlation, and selected as the output line, the target range of the following line is from the line N+3.5 to the line N+5.5, as shown in the state 705.

As described above, with the present embodiment, by limiting the target range of the following line to the range starting from the position selected in the current line, it is possible to avoid selecting positions whose order is reversed, and reduce the target range. Accordingly, the selectors 601 and 602, the correlation detecting units 603 and 604, the line position determining units 605 and 606 are greatly simplified. Note that the functions of the correlation detecting units 603 and 604, and the line position determining units 605 and 606 are the same as those in the first embodiment, and thus are not described here.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-178075 filed on Aug. 6, 2010, which is hereby incorporated by reference herein in its entirety.

The invention claimed is:

1. An image reading apparatus comprising:
a plurality of line sensors that are disposed in mutually different positions in a conveyance direction of an original document, and that respectively read the original document in line units and respectively output a read signal of a different color;
correlation detecting means for setting, as a reference signal, the read signal that is output from one of the plurality of line sensors, and detecting a correlation between the reference signal and each of a plurality of read signals output from other line sensors in a plurality of lines that are displaced in predetermined line units from a line from which the reference signal is read, such that positional displacement in a sub-scanning direction between the line sensors is corrected and line positions of read signals of each color are aligned; and
selecting means for selecting a read signal having a high correlation with the reference signal as a read signal from the line of the reference signal, based on a result of the detection performed by the correlation detecting means,
wherein the correlation detecting means comprises:
calculation means for calculating an absolute difference between the reference signal and the plurality of read signals output from the other line sensors, for each of a plurality of pixels included in each of the plurality of read signals; and
specifying means for specifying, for each pixel, a read signal having a high correlation with the reference signal based on the absolute differences calculated by the calculation means for the pixels included in each read signals, and
the selecting means selects a read signal including a largest number of pixels that have been specified by the specifying means to have a high correlation as a read signal from the line of the reference signal.

2. The image reading apparatus according to claim 1, wherein the plurality of read signals output from the other line sensors are read signals read by the other line sensors after a read signal of a line selected by the selecting means for an immediately previous reference signal.

3. The image reading apparatus according to claim 1, wherein the specifying means specifies, for each pixel, a smallest absolute difference among the plurality of absolute differences calculated by the calculation means as having a high correlation.

4. The image reading apparatus according to claim 1, wherein the specifying means specifies, for each pixel, if the absolute difference of a read signal of a line corresponding to the line from which the reference signal is read among the plurality of calculated absolute differences is less than or equal to a threshold, that the read signal and the reference signal have a high correlation, and specifies, for each pixel, a smallest absolute difference among the plurality of absolute differences of read signals of lines other than the line corresponding to the line from which the reference signal is read, as having a high correlation.

5. The image reading apparatus according to claim 1, wherein the specifying means specifies, for each pixel, an absolute difference that is less than or equal to a threshold among the plurality of calculated absolute differences as having a high correlation.

6. The image reading apparatus according to claim 1, wherein the correlation detecting means comprises:

calculation means for calculating an absolute difference between a read signal of each line and the reference signal, for each of a plurality of pixels included in one line; and accumulation means for accumulating, for each line, the absolute difference of each pixel calculated by the calculation means, and the selecting means selects a read signal of a line having a smallest accumulation value obtained by the accumulation means as a read signal from the line of the reference signal.

7. The image reading apparatus according to claim 1, wherein the calculation means calculates an absolute difference between an edge amount of a read signal of each line with an edge amount of the reference signal.

8. The image reading apparatus according to claim 1, wherein the correlation detecting means sets a read signal from a line sensor positioned in the middle of the plurality of line sensors as the reference signal.

9. An image reading method of an image reading apparatus that comprises a plurality of line sensors that are disposed in mutually different positions in a conveyance direction of an original document, and that respectively read the original document in line units and respectively output a read signal of a different color, the method comprising:

in correlation detecting means, setting, as a reference signal, the read signal that is output from one of the plurality of line sensors, and detecting a correlation between the reference signal and each of a plurality of read signals output from other line sensors in a plurality of lines that are displaced in predetermined line units from a line from which the reference signal is read, such that positional displacement in a sub-scanning direction between the line sensors is corrected and, line positions of read signals of each color are aligned; and in selecting means, selecting a read signal having a high correlation with the reference signal as a read signal from the line of the reference signal, based on a result of the detection performed in the setting and detecting performed by the correlation detecting means, wherein the correlation detecting means comprises:

in calculation means, calculating an absolute difference between the reference signal and the plurality of read signals output from the other line sensors, for each of a plurality of pixels included in each of the plurality of read signals; and in specifying means, specifying, for each pixel, a read signal having a high correlation with the reference signal based on the absolute differences calculated by the calculation means for the pixels included in each read signals, and the selecting means selects a read signal including a largest number of pixels that have been specified by the specifying means to have a high correlation as a read signal from the line of the reference signal.

10. A non-transitory computer-readable storage medium storing a computer program for causing a computer to execute the image reading method of claim 9.

* * * * *